United States Patent
Maeda et al.

(10) Patent No.: US 8,783,399 B2
(45) Date of Patent: Jul. 22, 2014

(54) SADDLE-RIDING TYPE VEHICLE INCLUDING MULTI-PART SHROUD

(75) Inventors: Kenichi Maeda, Saitama (JP); Kumi Okazaki, Saitama (JP); Munehiro Sugimoto, Saitama (JP); Takeshi Kamiyama, Saitama (JP); Osami Inomata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 13/550,818

(22) Filed: Jul. 17, 2012

(65) Prior Publication Data

US 2013/0026784 A1 Jan. 31, 2013

(30) Foreign Application Priority Data

Jul. 28, 2011 (JP) ................................ 2011-165369

(51) Int. Cl.
*B60K 11/00* (2006.01)
(52) U.S. Cl.
USPC .......................................................... 180/68.1
(58) Field of Classification Search
USPC ........................................ 180/68.1–68.4, 165
See application file for complete search history.

(56) References Cited

U.S. PATENT DOCUMENTS

| | | | | |
|---|---|---|---|---|
| 4,796,901 A | * | 1/1989 | Furukawa | 280/835 |
| 5,984,035 A | * | 11/1999 | Katoh et al. | 180/68.1 |
| 6,564,768 B2 | * | 5/2003 | Bauer et al. | 123/198 E |
| 6,705,272 B2 | * | 3/2004 | Leipelt et al. | 123/198 E |
| 7,314,107 B2 | * | 1/2008 | Nakagome et al. | 180/68.3 |
| 7,708,099 B2 | * | 5/2010 | Oodachi et al. | 180/229 |
| 2002/0083916 A1 | * | 7/2002 | Maurer et al. | 123/198 E |

FOREIGN PATENT DOCUMENTS

JP  2010-190141 A  9/2010

* cited by examiner

*Primary Examiner* — John Walters
*Assistant Examiner* — James Triggs
(74) *Attorney, Agent, or Firm* — Carrier Blackman & Associates, P.C.; Joseph P. Carrier; Anne G. Sabourin (57) ABSTRACT

In a saddle-riding type vehicle including a shroud, efficiency is achieved by disposing a vehicle component in a space shielded by the shroud, and the vehicle component is suitably protected from, for example, rainwater, while ventilation for the vehicle component is ensured. A regulator is disposed on a first side of the vehicle, at a position at which the regulator does not overlap a fuel tank as seen in a top plan view. The regulator is covered by a right shroud from above and from outside in the vehicle width direction. The right shroud has an opening formed therein at a portion where the regulator faces upwardly. The opening overlaps with, and is covered by from above by part of the right shroud that is different from the portion of the right shroud at which the opening is formed in a top plan view.

19 Claims, 13 Drawing Sheets

SADDLE-RIDING TYPE VEHICLE INCLUDING MULTI-PART SHROUD

CROSS-REFERENCE TO RELATED APPLICATIONS

The present invention claims priority under 35 USC 119 based on Japanese patent application No. 2011-165369, filed on Jul. 28, 2011. The entire subject matter of this priority document, including specification claims and drawings thereof, is incorporated by reference herein.

BACKGROUND OF THE INVENTION

1. Field of the Invention

The present invention relates to a saddle-type vehicle including a multi-part shroud. More particularly, the present invention relates to a saddle-type vehicle having a multi-part shroud, and a vehicle component protectively covered by the shroud.

2. Description of the Background Art

Japanese Patent Laid-Open No. 2010-190141 discloses a motorcycle that includes a fuel tank disposed above a main frame, which extends rearwardly from a head pipe, and a radiator disposed forwardly below the fuel tank.

In the motorcycle described in this reference, side portions of the fuel tank and the radiator are covered by a radiator shroud, and the radiator shroud has an air vent opening formed in an upper portion thereof.

SUMMARY OF THE INVENTION

Problem to be Solved by the Invention

In the motorcycle according to Patent Document 1 described above, there is a space between the radiator shroud and a member housed therein (e.g. the fuel tank and the radiator). Preferably, such a space is effectively utilized by disposing therein a component, such as an electrical component (hereinafter referred to as a vehicle component).

While the upward air vent opening provides ventilation for the vehicle component, a problem exists in that the vehicle component is directly exposed to, for example, rainwater.

The present invention has been made in view of the foregoing situation and it is an object of the present invention to provide a saddle-type vehicle in which efficiency in disposing parts is achieved by disposing a vehicle component in a space inward in a vehicle width direction of a shroud mounted in the saddle-type vehicle and that can suitably protect the vehicle component from, for example, rainwater, while achieving ventilation for the vehicle component.

Means for Solving the Problem

To achieve the foregoing object, a first aspect of the present invention provides a saddle-type vehicle including: a vehicle component disposed on a first side of a vehicle and spaced laterally away from a width direction centerline (C1) at a position at which the vehicle component does not overlap a fuel tank in a top plan view. The vehicle component is covered by a shroud, at least from above and from outside in the vehicle width direction.

The shroud has an opening formed therein at a portion thereof where the vehicle component faces upwardly, and the opening overlaps with, and is covered from above by a part of the shroud that is different from the portion of the shroud at which the opening is formed in a top view.

In a second aspect of the present invention, in addition to the arrangements of the first aspect, the shroud includes: an outer shroud for covering the vehicle component from the outside in the vehicle width direction; and an inner shroud disposed on an inside in the vehicle width direction of the outer shroud, the inner shroud for covering the vehicle component from forward and upward directions. The inner shroud has the opening formed therein, and the outer shroud has part thereof extending above the opening to thereby cover the opening.

In a third aspect of the present invention in addition to the arrangements of the first aspect, the outer shroud includes: a front shroud portion having an upper end disposed, in a side view, above the opening and a lower end disposed below the opening, the front shroud portion having a shape protruding forwardly from the upper end and the lower end to taper; and a rear shroud portion continuous with a rear portion of the front shroud portion and extending rearwardly; and the opening is covered by a portion on an upper portion side of the front shroud portion including the upper end.

In a fourth aspect of the present invention, in addition to the arrangements of the third aspect, at least part of the opening is covered, in a side view, by the rear shroud portion.

In a fifth aspect of the present invention, in addition to the arrangement of any of the second through fourth aspects, the inner shroud has a hole portion formed separately from the opening, the hole portion opening forwardly, and a horn is disposed so as to face outwardly through the hole portion.

In a sixth aspect of the present invention, in addition to the arrangement of any of the second through fourth aspects, the inner shroud has a hole portion formed separately from the opening, and a reservoir tank is disposed so as to partially face an outside through the hole portion.

In a seventh aspect of the present invention, in addition to the arrangement of any one of the foregoing aspects, the opening has a plurality of louvers formed on an inner peripheral edge thereof.

In an eighth aspect of the present invention, in addition to the arrangement of the saddle-type vehicle as defined in any one of the foregoing aspects, a radiator is disposed on a side of the vehicle opposite to the vehicle component across the vehicle width direction centerline (C1).

In a ninth aspect of the present invention, in addition to the arrangement of any one of the foregoing aspects, the vehicle component includes an electrical part.

Effects of the Invention

In the first aspect of the present invention, the vehicle component is disposed in a space on the inside in the vehicle width direction of the shroud. This makes disposition of parts efficient, achieving reduction in vehicle size. In addition, the opening formed in the shroud offers ventilation performance for the vehicle component, while part of the shroud covering the opening from above prevents the vehicle component from being in direct contact with, for example, rainwater, thus offering good protection for the vehicle component.

In the second aspect of the present invention, the outer and inner shrouds are manufactured separately from each other. This facilitates making of the opening as compared with the outer and inner shrouds being manufactured integrally.

In the third aspect of the present invention, the outer shroud is divided into the front portion and the rear portion. This allows the parts to be built small, leading to an improved degree of freedom in part geometry.

In the fourth aspect of the present invention, the outer shroud covers the opening from the upward direction and the outside in the vehicle width direction. This improves protection for the vehicle component.

In the fifth aspect of the present invention, part of the horn is covered by the inner shroud and the outer shroud to thereby improve protection and appearance of the horn. Meanwhile, the horn is adapted to face outwardly through the hole portion, which allows the horn to produce sound properly.

In the sixth aspect of the present invention, the reservoir tank is covered by the inner shroud and the outer shroud, to thereby improve protection and appearance of the reservoir tank. Meanwhile, the part of an outline of the reservoir tank is adapted to face outwardly through the hole portion, which allows the capacity of the reservoir tank to be checked from the outside easily.

In the seventh aspect of the present invention, the louvers further prevent the opening from being in direct contact with external contaminants such as, for example, rainwater, and the louvers also allow a flow of heat dissipation from the inside of the shroud to be smoothed.

In the eighth aspect of the present invention, the radiator is disposed on a side opposite to the side on which the vehicle component is disposed. This achieves a good weight balance of a vehicle body forward section.

In the ninth aspect of the present invention, the electrical part can be protected from external contaminants slush as, for example, dirt and rainwater.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

A specific embodiment to which the present invention is applied will be described below with reference to the accompanying drawings. In the drawings to be used for describing the embodiment below, an arrow FR denotes a vehicle front direction, an arrow UP denotes a vehicle upward direction, and an arrow LH denotes a vehicle leftward direction, respectively.

A motorcycle 1 shown is configured as an off-road type vehicle. The motorcycle 1 includes a vehicle body frame 2. The vehicle body frame 2 includes a pair of left and right main frames 4L and 4R and a single down frame 5. Specifically, the left and right main frames 4L and 4R extend obliquely downwardly toward the rear from a head pipe 3. The down frame 5 extends downwardly from the head pipe 3 at a portion downward of the main frames 4L and 4R.

The motorcycle 1 includes an engine E that is a water-cooled four-cycle type. The engine E includes a cylinder 6 and a crankcase 7, and is disposed below the main frames 4L and 4R. The cylinder 6 is disposed at a front portion of the crankcase 7 in such a condition that a cylinder axis thereof extends obliquely upwardly toward the front of the motorcycle. The cylinder 6 has a front portion disposed adjacent to a rear surface of the down frame 5 in a longitudinal direction.

A pair of left and right front forks 8L and 8R are steerably supported on the head pipe 3. A front wheel 9 is rotatably supported on the head pipe 3 at a lower portion of the front forks 8L and 8R. A steering handlebar 10 is disposed above the front forks 8L and 8R. A front cowl 12, mounted with a headlight 11, is disposed in front of the steering handlebar 10. Additionally, a front fender 13 is disposed below the front cowl 12. The front fender 13 has a lower rear end portion disposed in front of the cylinder 6.

A fuel tank 14 is disposed above the main frames 4L and 4R. The fuel tank 14 extends longitudinally along the main frames 4L and 4R. A seat 15 is disposed in back of the fuel tank 14. The seat 15 has a front portion covering a rear upper wall portion of the fuel tank 14.

A pair of left and right center side cowls 16L and 16R are disposed below the seat 15. Each of the center side cowls 16L, 16R has a long shape extending in the vehicle longitudinal direction.

An exhaust pipe 17 is connected to an exhaust port at a front wall of the cylinder 6, and extends obliquely downwardly toward the front before curving in a U-shape to extend rearwardly. The exhaust pipe 17 then extends obliquely upwardly toward the rear, past the right side wall of the cylinder 6, and has a rear end connected to a muffler. A heat shield protector 17A extending along the exhaust pipe 17 is disposed at a portion of the exhaust pipe 17 adjacent to the right side wall of the cylinder 6.

Figure 2:
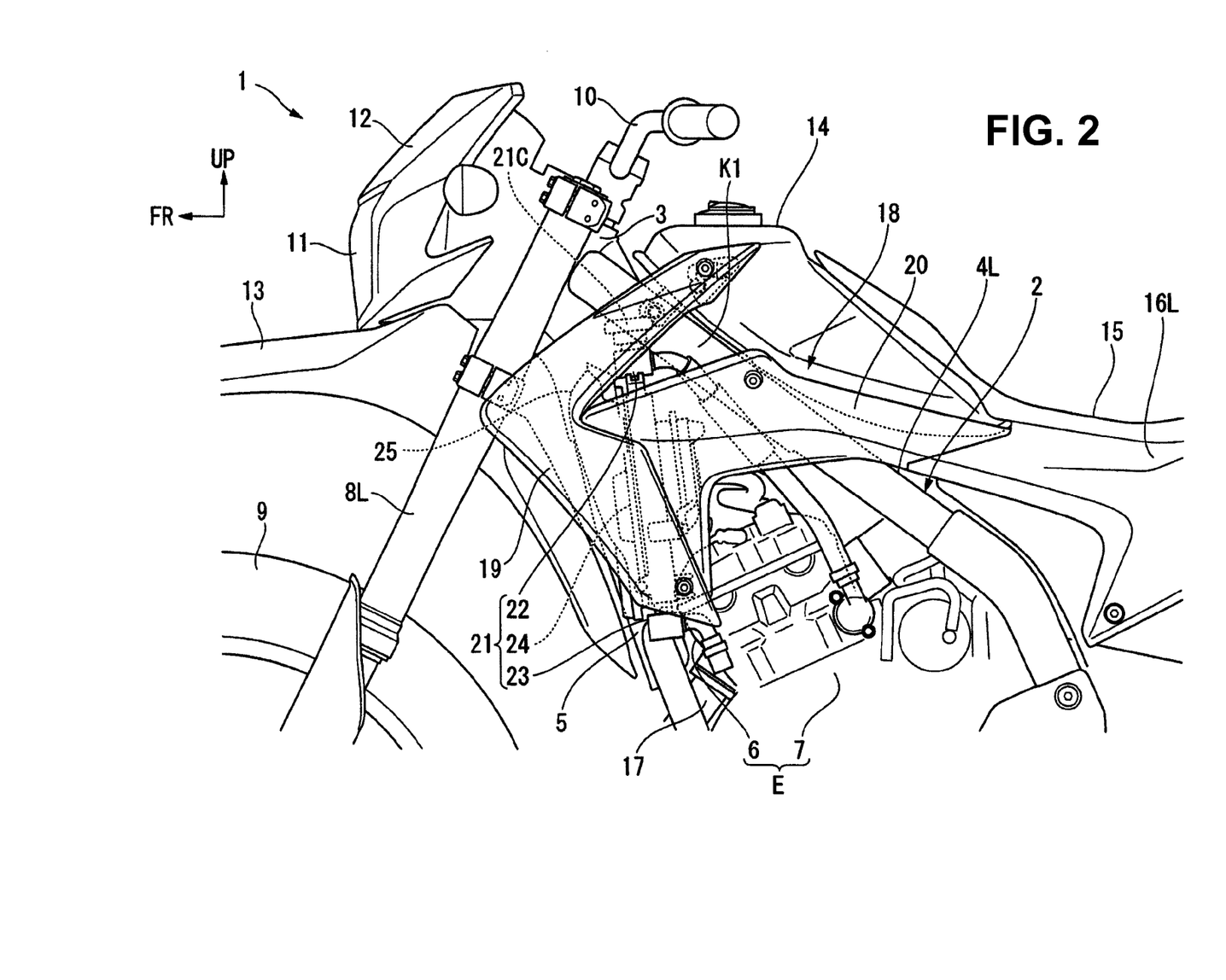
FIG. 2 is a left side elevational view showing the motorcycle according to the embodiment of the present invention.

Referring to FIG. 2, a left shroud 18, formed of a resin material, is disposed in front of the left center side cowl 16L. The left shroud 18 is formed to include two members, specifically, a left front shroud portion 19 and a left rear shroud portion 20. More specifically, the left front shroud portion 19 has an upper end fixedly disposed on a front portion outer wall of the fuel tank 14 and a lower end disposed on a side of the cylinder 6. In a side view, the left front shroud portion 19 has a sideways chevron shape having a central portion which extends forwardly from the upper and lower ends to taper. The left rear shroud portion 20 is continuous with a rear portion of a lower straight portion of the chevron-shaped left front shroud portion 19, extending rearwardly.

Figure 3:
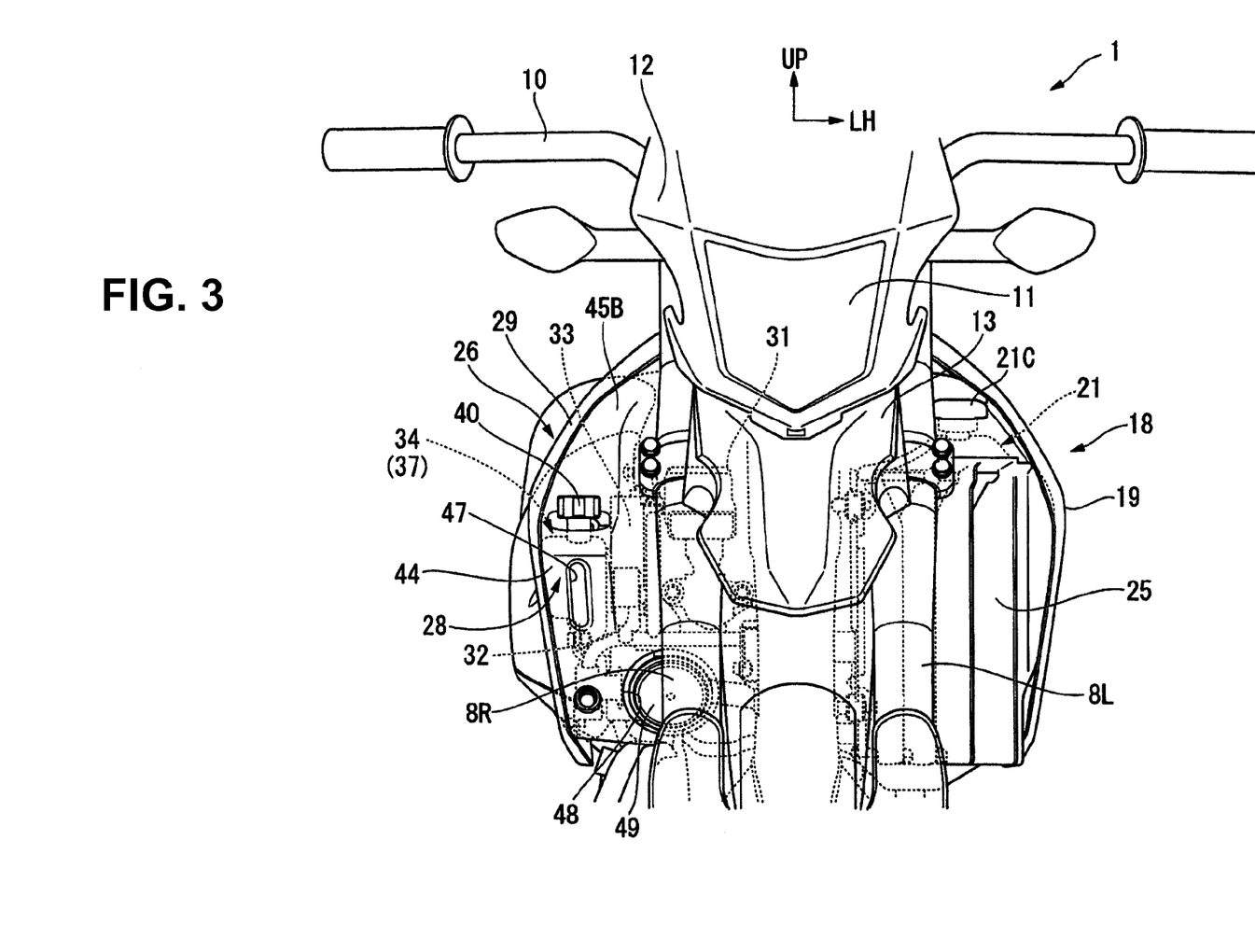
FIG. 3 is a front elevational view showing the motorcycle according to the embodiment of the present invention.
Figure 4:
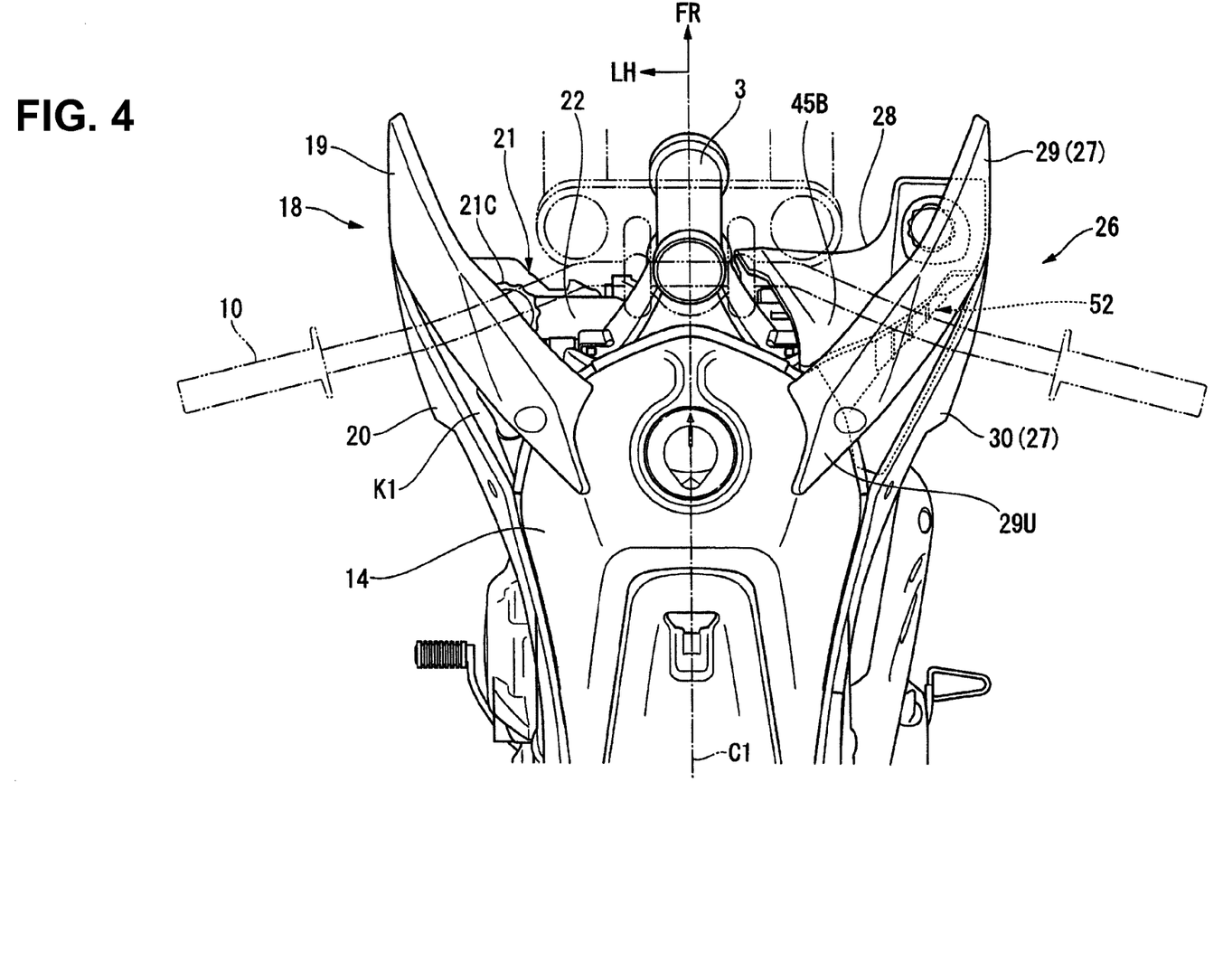
FIG. 4 is a top plan view showing the motorcycle according to the embodiment of the present invention.

Referring to FIG. 3, in a front view, the left front shroud portion 19 curves outwardly in a vehicle width direction from the front portion outer wall of the fuel tank 14 and then extends downwardly. Referring to FIG. 4, in a top view, the left rear shroud portion 20 extends rearwardly from the left front shroud portion 19 so as to gradually approach a vehicle width direction centerline C1. Additionally, referring to FIG. 2, in a side view, the left rear shroud portion 20 has an upper edge extending rearwardly so as to follow along a lower edge of the fuel tank 14.

Figure 6:
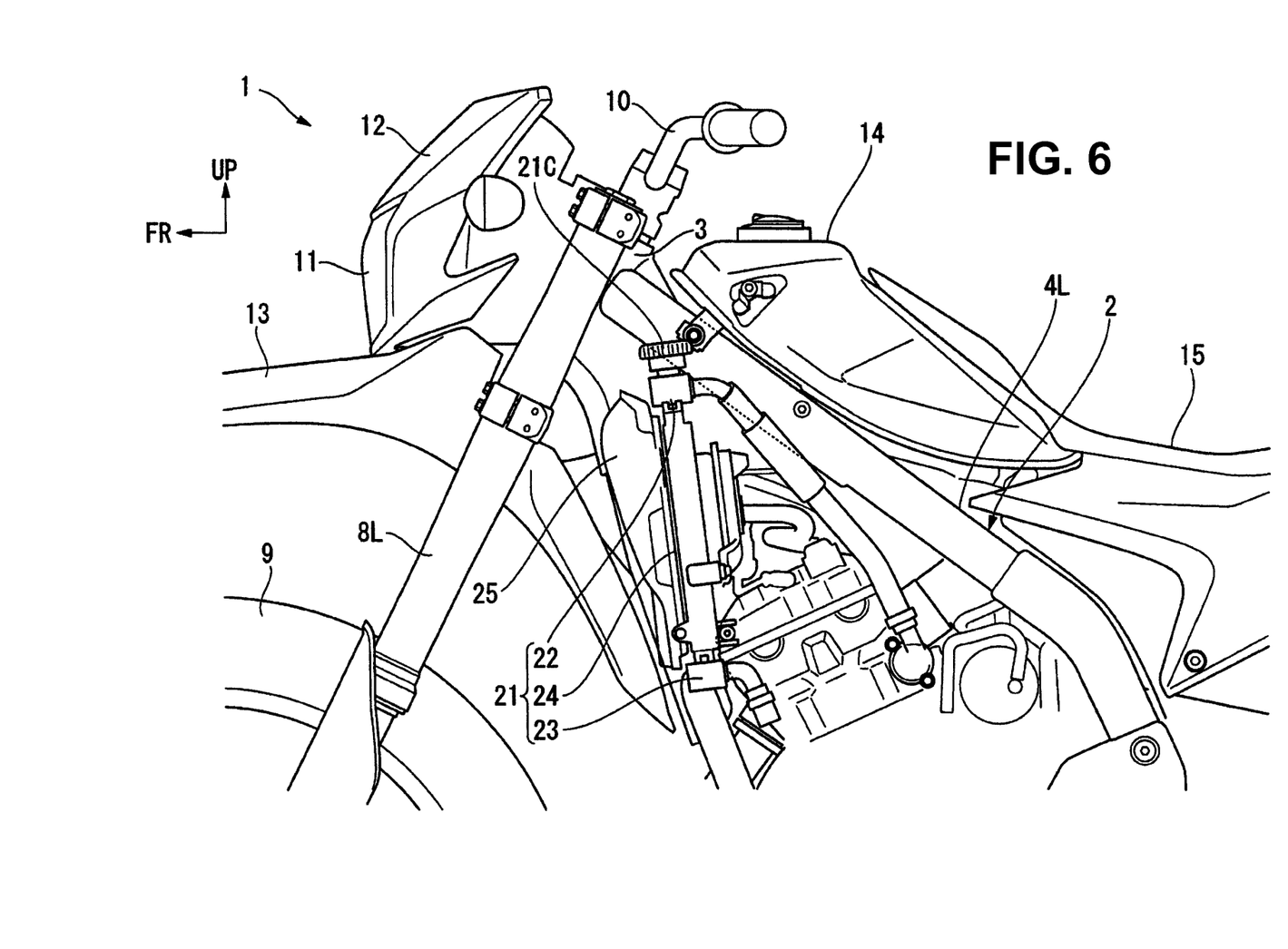
FIG. 6 is a left side elevational view showing the motorcycle according to the embodiment of the present invention from which the shroud is removed.
Figure 7:
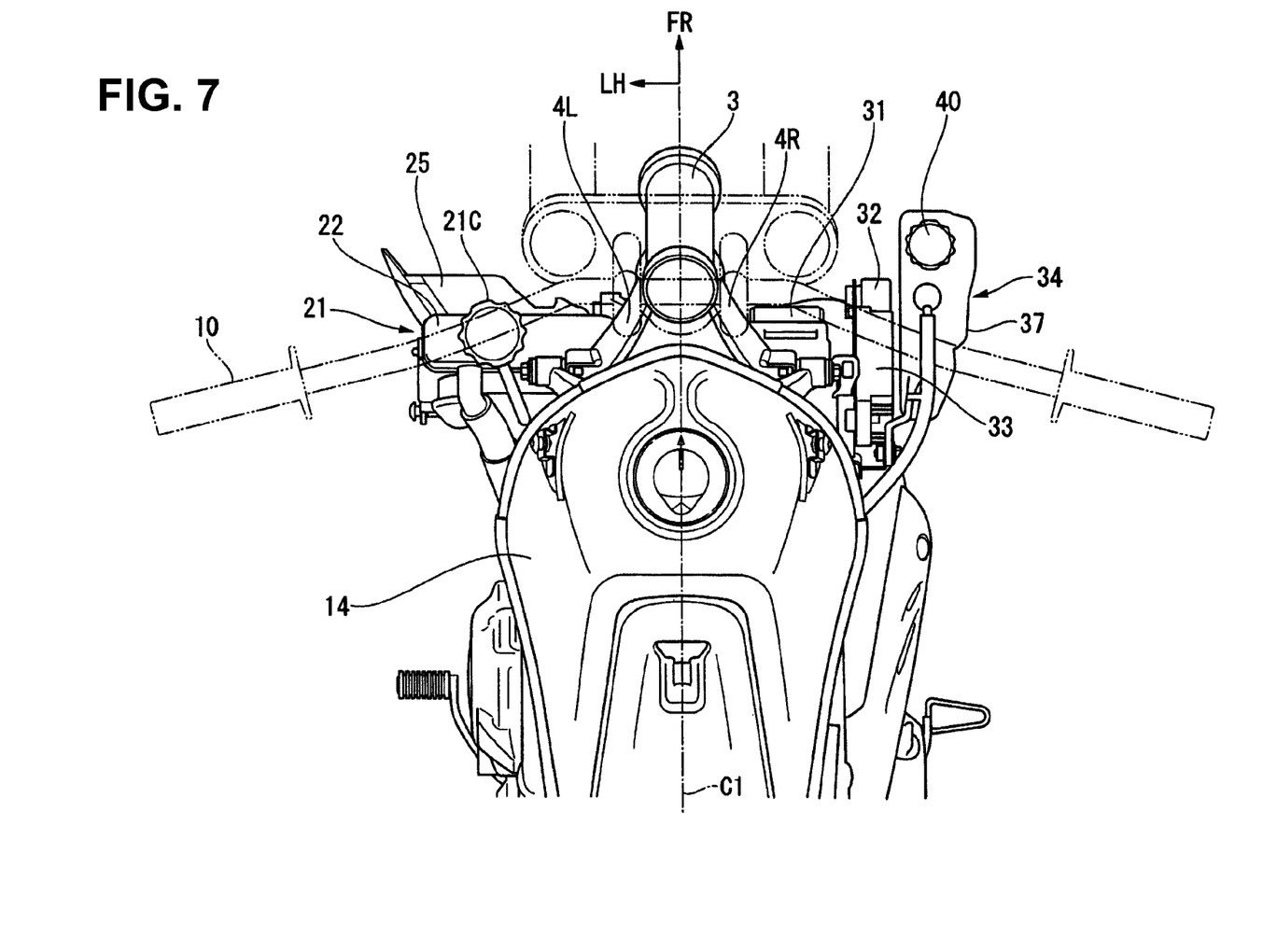
FIG. 7 is a top view showing the motorcycle according to the embodiment of the present invention from which the shroud is removed.
Figure 8:
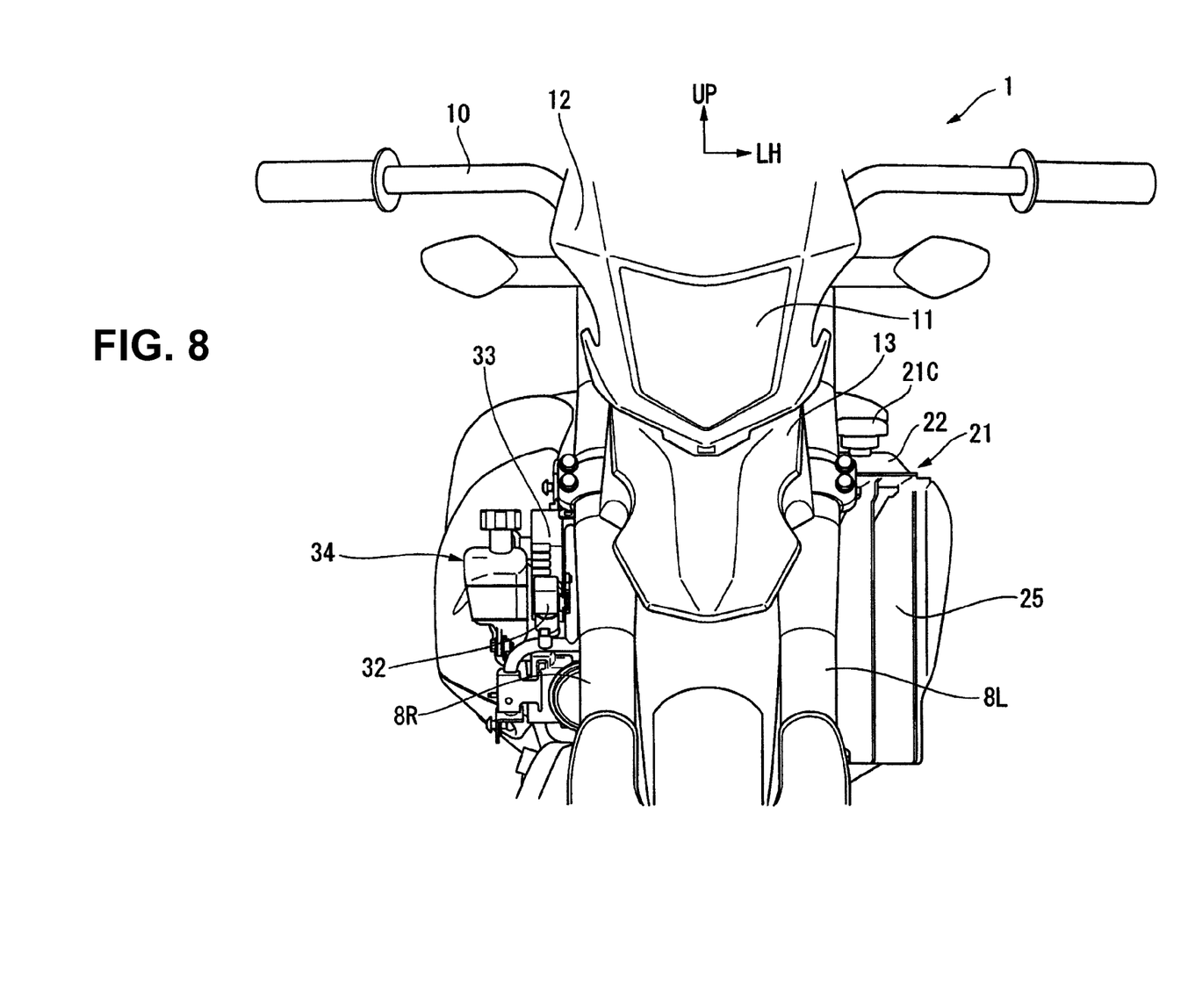
FIG. 8 is a front elevational view showing the motorcycle according to the embodiment of the present invention from which the shroud is removed.

Referring to FIGS. 2 to 4 in comparison with FIGS. 6 to 8, a radiator 21 is disposed on the inside in the vehicle width direction of the left front shroud portion 19 in the left shroud 18 on the left-hand side of the vehicle width direction centerline C1. The left front shroud portion 19 covers the radiator 21 from the outside, in the vehicle width direction.

The radiator 21 is a down flow type radiator including a radiator core 24 disposed between an upper tank 22 and a lower tank 23. The radiator 21 is disposed such that an air intake guide surface of the radiator core 24 faces the forward direction of the vehicle. The upper tank 22 of the radiator 21 has a radiator cap 21C that includes a pressure regulating valve. A grille 25 is disposed on the front surface side of the radiator core 24. The grille 25 has a plurality of louvers extending vertically and inclined outwardly in the vehicle width direction from the rear toward the front.

Referring to FIGS. 2 and 4, in a condition in which the left front shroud portion 19 and the left rear shroud portion 20 are connected together, a space K1 is formed between the left front shroud portion 19 and the left rear shroud portion 20. The space K1 is open outwardly in the vehicle width direction. The space K1 functions as an air-outlet opening through which air flows outwardly after having already flowed through the radiator 21.

Figure 1:
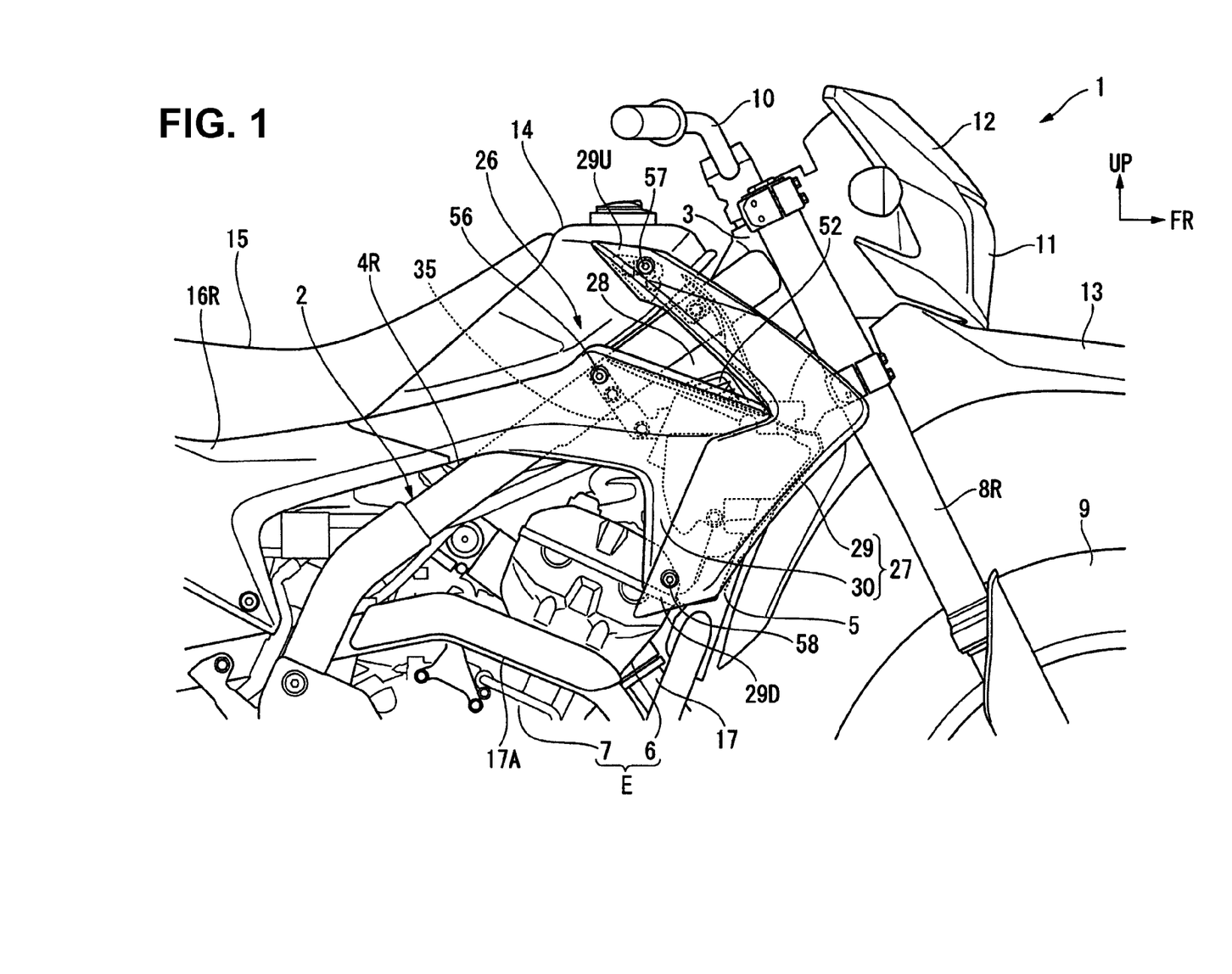
FIG. 1 is a right side elevational view showing a motorcycle according to an embodiment of the present invention.

A right shroud 26 formed of a resin material and disposed in front of the right center side cover 16R will be described below. Referring to FIGS. 1 and 4, the right shroud 26 includes an outer shroud 27 and an inner shroud 28. Specifically, the outer shroud 27 is formed of two members. The inner shroud 28 is disposed inside the outer shroud 27 in the vehicle width direction.

The outer shroud 27 is a similar figure to the left shroud 18. In a side view, the outer shroud 27 has an upper end 29U fixedly disposed on a front portion outer wall of the fuel tank 14 and a lower end 29D disposed on a side of the cylinder 6. The outer shroud 27 includes a right front shroud portion 29 and a right rear shroud portion 30. The right front shroud portion 29 has a sideways chevron shape, as shown, in which a center portion extends forwardly from upper and lower ends 29U, 29D to taper. The right rear shroud portion 30 is continuous with a rear part of the chevron-shaped right front shroud portion 29, and extends rearwardly therefrom.

Referring to FIG. 3, in a front view, the right front shroud portion 29 curves outwardly in the vehicle width direction from the front outer wall portion of the fuel tank 14, and then extends downwardly. Referring to FIG. 4, in a top view, the right rear shroud portion 30 extends rearwardly from the right front shroud portion 29 so as to gradually approach the vehicle width direction centerline C1. Additionally, in a side view, the right rear shroud portion 30 has an upper edge extending rearwardly to follow along the lower edge of the fuel tank 14.

Referring to FIGS. 3 and 4 in comparison with FIGS. 5 and 7 to 10, an engine control unit (ECU) 31, a direction indicator relay 32, a regulator 33, and a reservoir tank 34 are disposed on the right-hand side in the vehicle width direction across the vehicle width direction centerline C1 and inside the right front shroud portion 29 in the vehicle width direction. The right front shroud portion 29 covers the ECU 31, the direction indicator relay 32, the regulator 33, and the reservoir tank 34 from outside in the vehicle width direction.

In a top view, the ECU 31, the direction indicator relay 32, the regulator 33, and the reservoir tank 34 are disposed forwardly on the right of the fuel tank 14, not overlapping therewith. Referring to FIGS. 10 to 13, the inner shroud 28 covers the ECU 31, the direction indicator relay 32, the regulator 33, and the reservoir tank 34 from forward and above, inside of the outer shroud 27 in the vehicle width direction.

Figure 5:
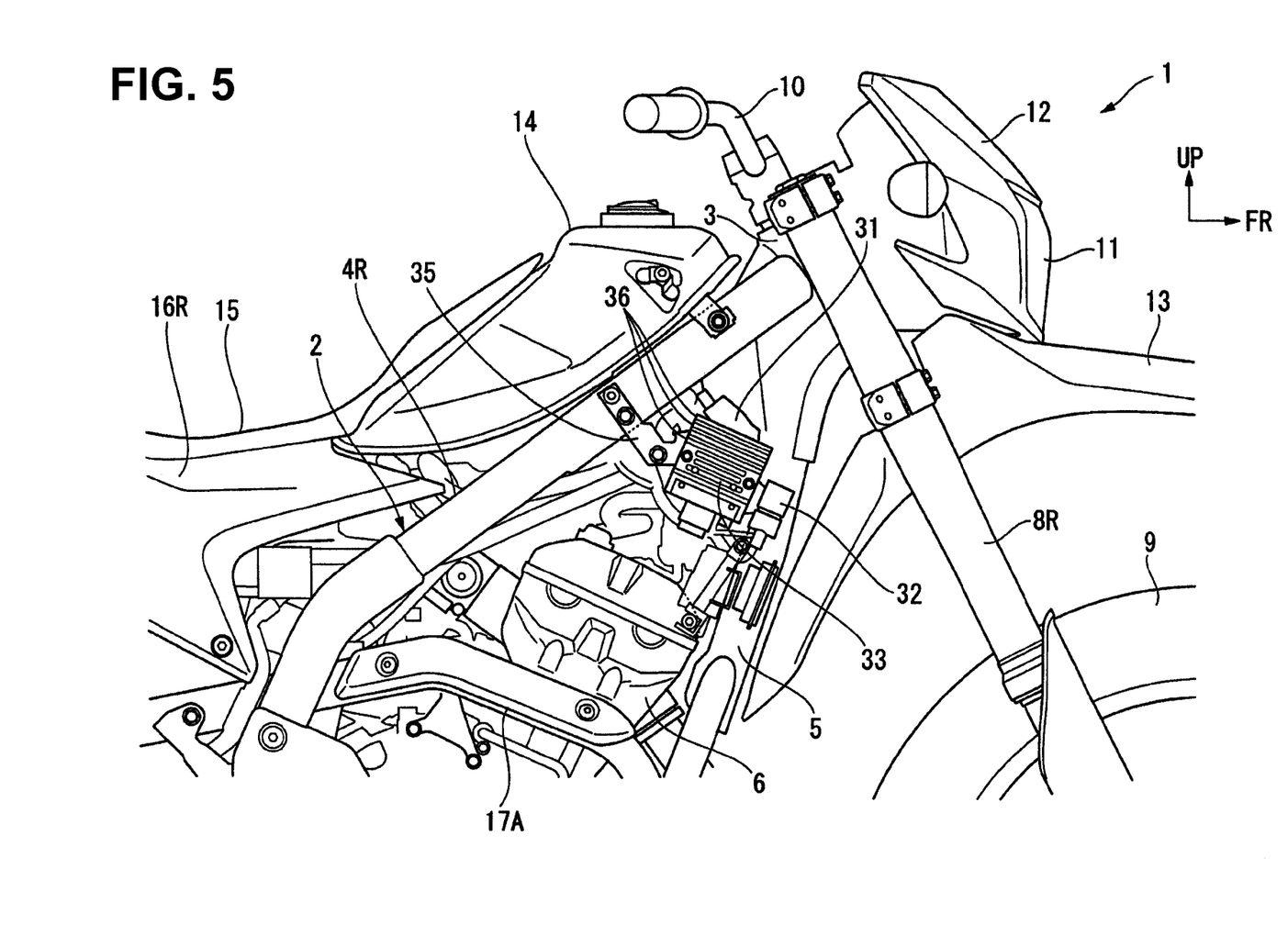
FIG. 5 is a right side elevational view showing the motorcycle according to the embodiment of the present invention from which a shroud is removed.
Figure 9:
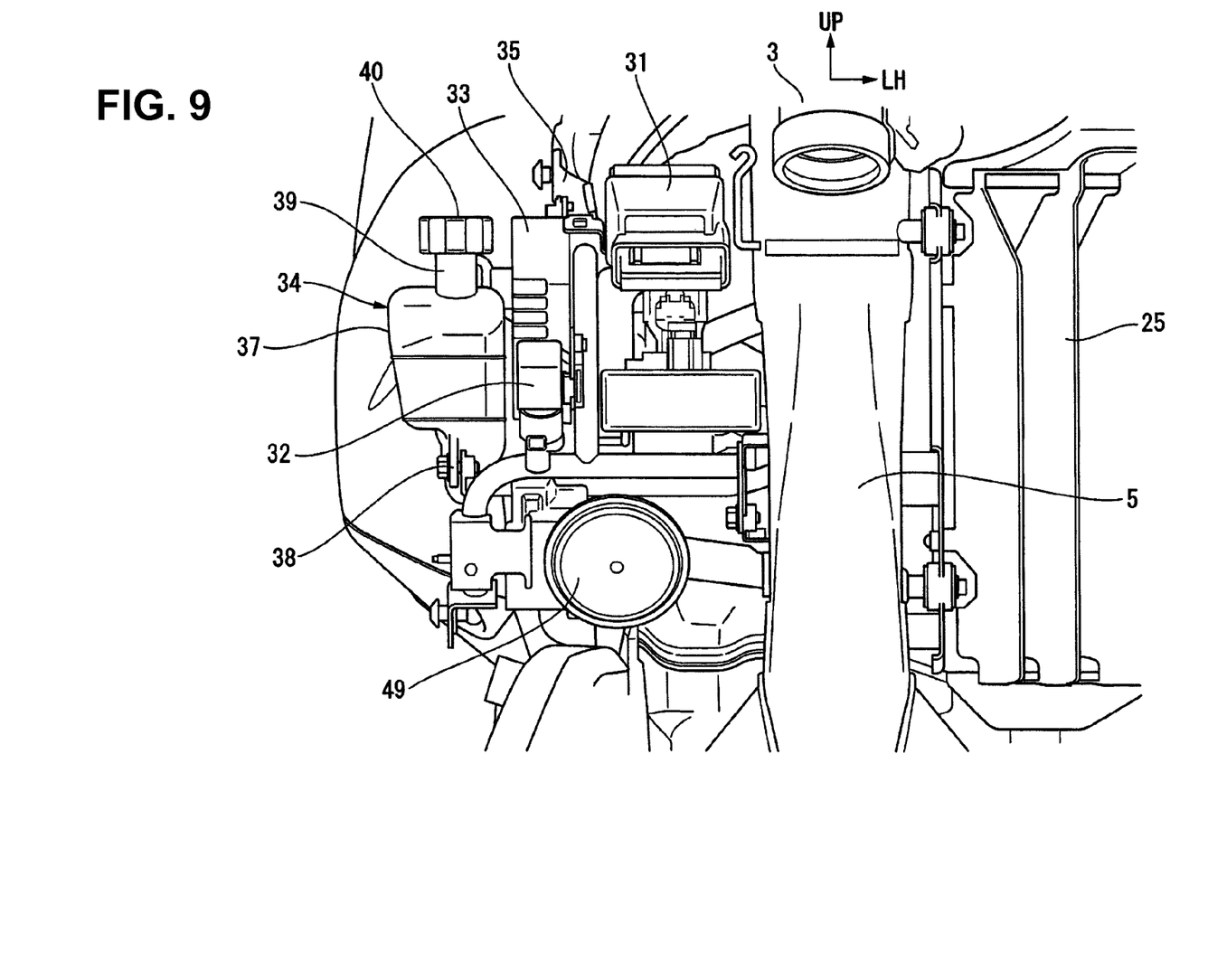
FIG. 9 is an enlarged view showing a main section of FIG. 8.
Figure 10:
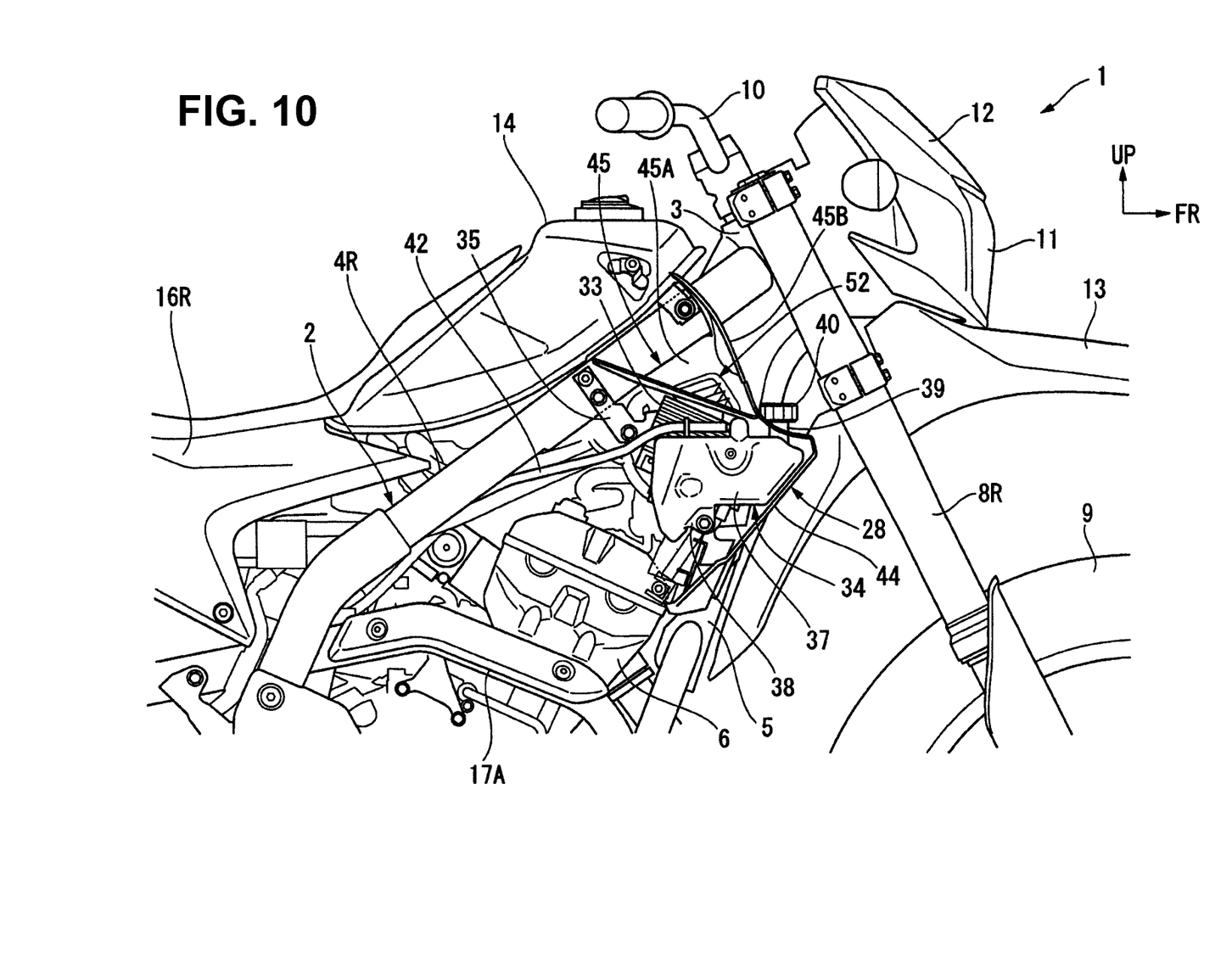
FIG. 10 is a right side elevational view showing the motorcycle according to the embodiment of the present invention from which an outer shroud is removed, showing a reservoir tank.

Referring to FIGS. 5, 9, and 10, a bracket 35 formed of metal, extending downwardly, is fastened and fixed to the right main frame 4R. The ECU 31, the direction indicator relay 32, the regulator 33, and the reservoir tank 34 are fixed to the bracket 35. The direction indicator relay 32 and the regulator 33 are disposed in tandem longitudinally on the outside of the ECU 31 in the vehicle width direction. The reservoir tank 34 is disposed on the outside of the regulator 33 in the vehicle width direction.

Referring to FIG. 5, the regulator 33 is rectangular in shape in a side view and has a plurality of fins 36 protruding outwardly in the vehicle width direction. The regulator 33 is fixed to the bracket 35 such that the fins 36 extend obliquely downwardly toward the front.

Referring to FIGS. 9 and 10, the reservoir tank 34 includes a main tank body 37 formed of a resin material, in which coolant to be supplied to the radiator 21 is stored. The reservoir tank 34 includes a fastening and fixing portion 38 relative to the bracket 35 and disposed on a bottom portion side thereof. The reservoir tank 34 is fixed in place with the fastening and fixing portion 38 on the lower side. The reservoir tank 34 includes a mouth portion 39 for receiving the coolant. The mouth portion 39 is formed to protrude into a cylindrical shape from the main tank body 37, extending upwardly from a front side upper portion of the main tank body 37. The mouth portion 39 is fitted with a cap 40.

It is here noted that the reservoir tank 34 and the radiator 21 are disposed on opposite sides of the vehicle, across the vehicle width direction centerline C1, and are connected together by a siphon tube (not shown). The siphon tube has a first end connected to an inner side surface of the main tank body 37, and a second end connected to the radiator cap 21C of the radiator 21 across the vehicle width direction centerline C1. In addition, referring to FIG. 10, a drain hose 42 is connected to an upper portion of the main tank body 37, and is extended downwardly toward the rear.

Referring to FIGS. 10 to 13, the inner shroud 28 includes a front wall portion 44 and an upper wall portion 45. The front wall portion 44 covers the reservoir tank 34 from the forward direction. The upper wall portion 45 covers the reservoir tank 34 from the upward direction. The inner shroud 28 covers the reservoir tank 34 such that a corner portion at which the front wall portion 44 and the upper wall portion 45 join together faces forwardly. The upper wall portion 45 has a through hole 46 formed at the front side thereof. The mouth portion 39 and the cap 40 of the reservoir tank 34 extend upwardly through the through hole 46 of the inner shroud.

Figure 12:
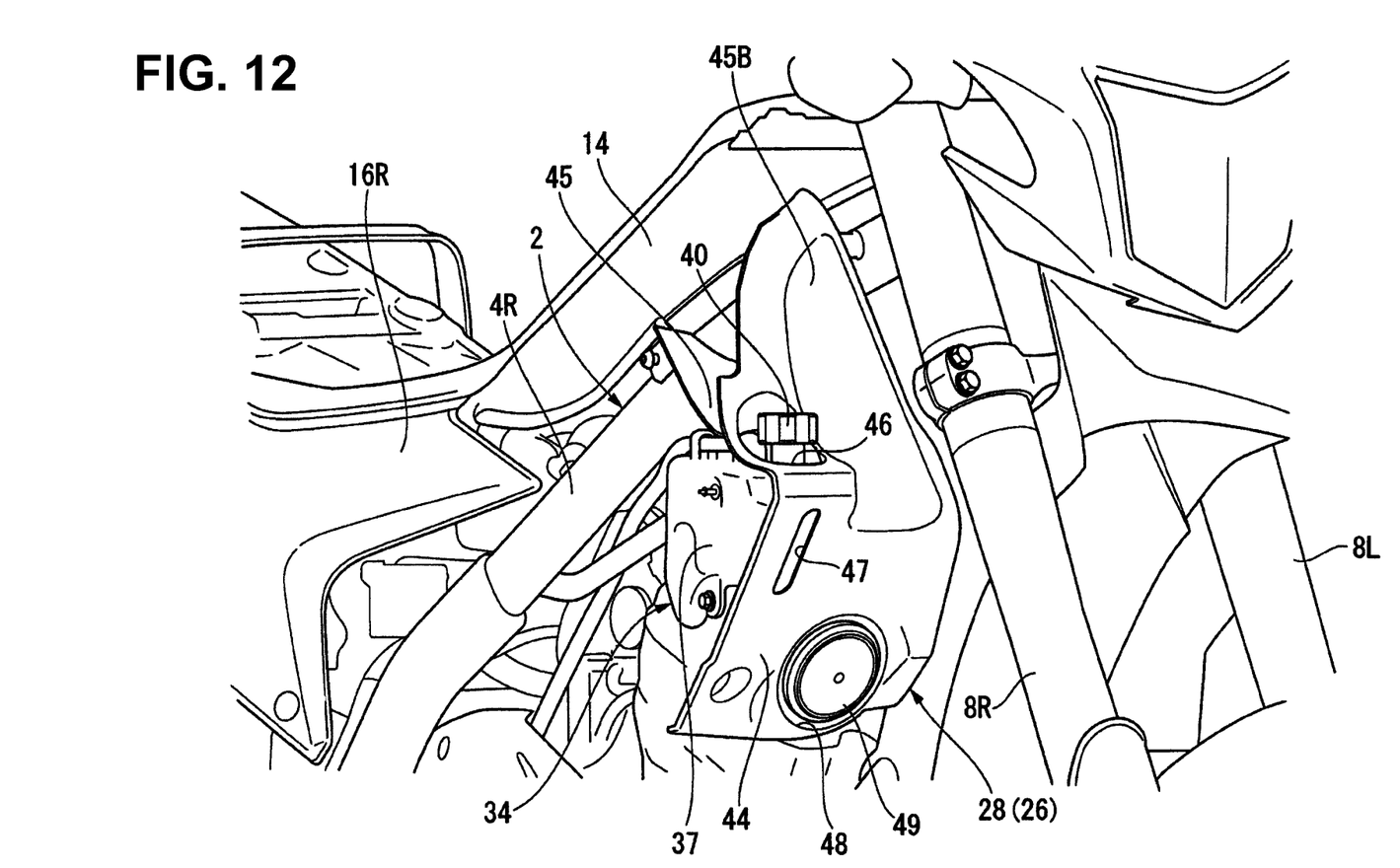
FIG. 12 is a perspective view showing the motorcycle according to the illustrative embodiment of the present invention, as viewed from a right front vantage point, with the outer portion of the shroud removed.

Referring to FIGS. 12 and 3, the front wall portion 44 of the inner shroud 28 has a narrow slot portion 47 formed therein and extending vertically. The main tank body 37 of the reservoir tank 34 is visible through the slot portion 47. It is here noted that the main tank body 37 is formed of a transparent resin or a translucent resin. In addition, the front wall portion 44 further has a circular hole portion 48 formed at a lower portion side thereof. A horn 49 faces the outside through the circular hole portion 48. The horn 49 is fixedly disposed below the ECU 31.

Figure 11:
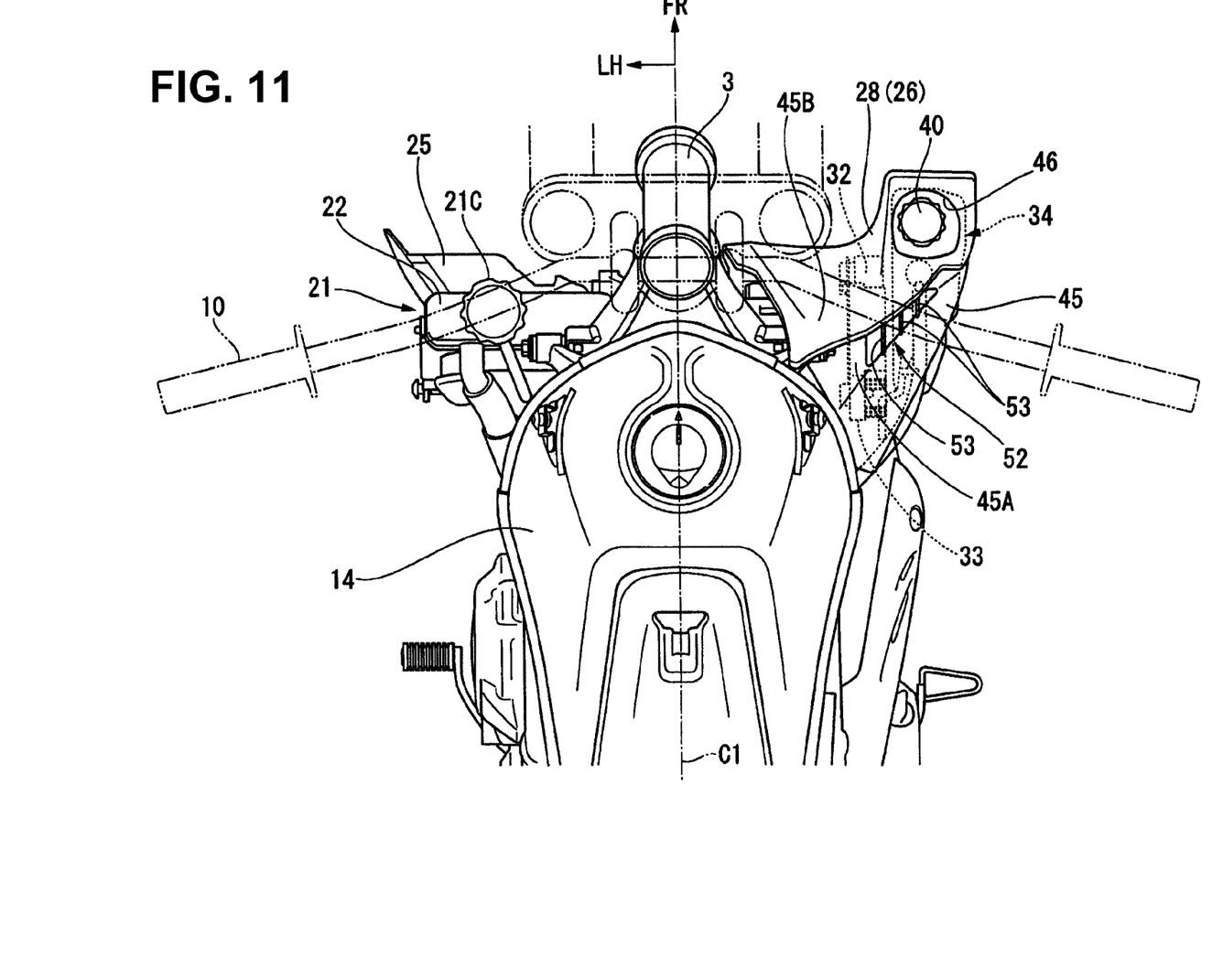
FIG. 11 is a top view showing the motorcycle according to the embodiment of the present invention from which the outer shroud is removed.
Figure 13:
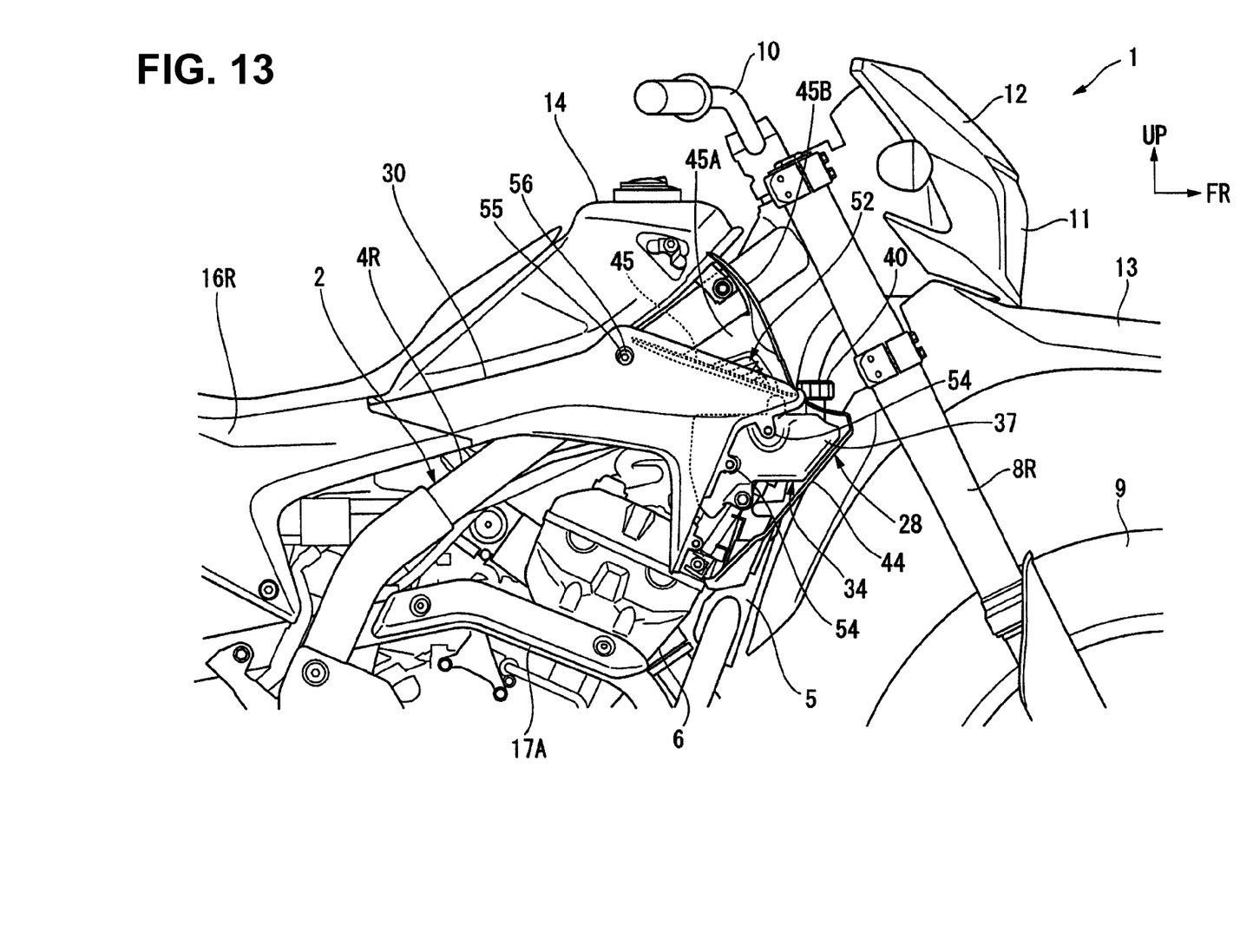
FIG. 13 is a right side elevational view showing the motorcycle according to the embodiment of the present invention from which part of the outer shroud is removed.

Referring to FIGS. 11 and 13, a portion in the upper wall portion 45 of the inner shroud 28 in back of the through hole 46 is inclined so as to extend upwardly toward the inside in the vehicle width direction. A portion in the inclined surface 45A which the regulator 33 faces upwardly has an opening 52 formed therein. The opening 52 is formed into a slit extending from the rear to the front outwardly in the vehicle width direction. The opening 52 has a plurality of louvers 53 . . . formed in a longitudinal direction. The louvers 53 . . . extend vertically.

Referring to FIGS. 1 and 4, the opening 52 overlaps the right front shroud portion 29 of the outer shroud 27 in a top view and is upwardly covered by the right front shroud portion 29. Further in a side view, the lower portion side of the opening 52 is covered by the right rear shroud portion 30. Specifically, in this embodiment, the right front shroud portion 29 has its upper end 29U disposed above the opening 52, and has the upper straight portion of its sideways chevron shape covering the opening 52.

Referring to FIGS. 11 and 12, an extended front wall portion 45B is formed at a portion in back of the through hole 46, in the upper wall portion 45 of the inner shroud 28, and in front of the opening 52. The extended front wall portion 45B stands upwardly toward the rear.

Referring to FIG. 3, the extended front wall portion 45B abuts against an inner peripheral surface of the upper straight portion of the sideways chevron shape of the right front shroud portion 29. This fills a space, in a front view, between the inner shroud 28 and the right front shroud portion 29, so that the opening 52 is covered by the extended front wall portion 45B also from the front side.

Mounting of the outer shroud 27 including the right front shroud portion 29 and the right rear shroud portion 30 will be described below. When the outer shroud 27 is to be mounted, referring to FIG. 13, a pair of upper and lower mounting tabs 54, 54 formed at the front edge of the right rear shroud portion 30 is fixed to the main tank body 37 of the reservoir tank 34. At the same time, a bolt 56 is passed through an insertion hole 55 formed at a substantially central position in the longitudinal direction of the right rear shroud portion 30 to thereby fix the right rear shroud portion 30 to the right side portion of the right main frame 4R.

Then, referring to FIG. 1, the right front shroud portion 29 is mounted so that the right side portion of the reservoir tank 34 that is exposed from the right rear shroud portion 30 is covered by the lower portion of the right front shroud portion 29. While being appropriately locked onto the inner shroud 28 by a clip not shown, the right front shroud portion 29 has its upper end 29U side fastened and fixed with a bolt 57 to an outer wall of the fuel tank 14 and its lower end 29D side fastened and fixed with a bolt 58 to a lower portion side of the right rear shroud portion 30.

As described herein, in the motorcycle 1 described above, the regulator 33 is disposed on a first side in the vehicle width direction across the vehicle width direction centerline C1 at a position at which the regulator 33 does not overlap the fuel tank 14 in a top view. The right shroud 26 covers the regulator 33 from the upward direction and from outside in the vehicle width direction. The right shroud 26 has the opening 52 formed at a portion thereof at which the regulator 33 faces upwardly. In a top view, the opening 52 overlaps part of the right shroud 26 that is different from the portion thereof in which the opening 52 is formed and is covered from above.

In the arrangements as described above, the regulator 33 as a vehicle component is disposed in a space inside of the right shroud 26 in the vehicle width direction. This makes disposition of parts efficient, achieving reduction in vehicle size. In addition, the opening 52 formed in the right shroud 26 offers ventilation performance for the regulator 33, while part of the right shroud 26 covering the opening 52 from above prevents the regulator 33 from being in direct contact with, for example, rainwater, thus offering good protection for the regulator 33.

In the embodiment described above, the right shroud 26 includes the outer shroud 27 and the inner shroud 28. Manufacturing the inner and outer shrouds separately in this manner improves the degree of freedom in design, and makes it easier to form the opening 52 than manufacturing the shrouds integrally. In addition, the outer shroud 27 includes the right front shroud portion 29 and the right rear shroud portion 30. Separating the outer shroud 27 as described above allows the parts (shroud itself) to be built small, leading to an improved degree of freedom in part geometry.

In the embodiment described above, part of the opening 52 is covered by the right rear shroud portion 30 in a side view. This improves protection for the regulator 33. It is noted that the side of the opening 52 may generally be covered by the right rear shroud portion 30; however, partial covering ensures good air flow.

In the embodiment described above, part of the horn 49 is covered by the inner shroud 28 and the outer shroud 27 to thereby improve protection and appearance of the horn 49. Meanwhile, the horn 49 is adapted to face the outside through the circular hole portion 48, which allows the horn 49 to produce sound properly.

In addition, the reservoir tank 34 is covered by the inner shroud 28 and the outer shroud 27 to thereby improve protection and appearance of the reservoir tank 34. Meanwhile, the part of an outline of the reservoir tank 34 is adapted to face the outside through the slot portion 47, which allows the capacity of the reservoir tank 34 to be checked from the outside easily.

Additionally, in the embodiment described above, the opening 52 has a plurality of the louvers 53 formed proximate an inner peripheral edge thereof. The louvers 53 further prevent the opening 52 from being in direct contact with, for example, rainwater and allow a flow of heat dissipation from the inside of the shroud to be smoothed. In addition, the radiator 21 is disposed on a side opposite to the side on which, for example, the regulator 33 is disposed across the vehicle width direction centerline C1. This achieves a good weight balance of a vehicle body forward section.

While there has been described what is presently considered to be the preferred embodiment, it will understood by those skilled in the art that the above description of embodiment is not intended to be limiting in scope and other modifications can be made within the spirit of the invention.

For example, although the above embodiment has been described for the motorcycle 1 as an example of the saddle-riding type vehicle of the present invention, the invention may be applied to, for example, an auto three-wheeled vehicle having the above-described arrangements. It should also be noted that the above embodiment has been described for the off-road type motorcycle 1, the embodiment is not limiting in scope and the present invention may be applied to various other types of motorcycles and other saddle-riding type vehicles.

What is claimed is:

1. A saddle-riding type vehicle comprising:
a vehicle component disposed on a first side of the vehicle across a vehicle width direction centerline at a position at which the vehicle component does not overlap a fuel tank in a top view, and
a shroud, including an outer shroud and an inner shroud, wherein:
the vehicle component is covered by the shroud at least from an upward direction and from outside in the vehicle width direction,
the shroud has an opening formed therein at a portion thereof where part the vehicle component faces upwardly, and
another part of the shroud overlaps the opening, and covers the opening from above.

2. The saddle-riding type vehicle according to claim 1, wherein the outer shroud covers the vehicle component from outside in the vehicle width direction, and the inner shroud is disposed inside of the outer shroud and covers the vehicle component from forward and above, the inner shroud having the opening formed therein, and wherein part of the outer shroud extends over the opening to cover the opening.

3. The saddle-riding type vehicle according to claim 2, wherein:
the outer shroud includes a front shroud portion having an upper end disposed, in a side view, above the opening and a lower end disposed below the opening, the front shroud portion having a sideways chevron shape, and a rear shroud portion continuous with and extending rearwardly from a rear part of the front shroud portion, and
the opening is covered by an upper part of the front shroud portion including the upper end.

4. The saddle-riding type vehicle according to claim 3, wherein at least part of the opening is covered, in a side view, by the rear shroud portion.

5. The saddle-riding type vehicle according to claim 1, wherein the inner shroud has a hole formed therein separately from the opening, the hole opening forwardly, and wherein a horn is disposed so as to face outwardly through the hole.

6. The saddle-riding type vehicle according to claim 1, wherein the opening has a plurality of louvers formed proximate an inner peripheral edge thereof.

7. The saddle-riding type vehicle according to claim 1, wherein a radiator is disposed substantially opposite to the vehicle component across the vehicle width direction centerline.

8. The saddle-riding type vehicle according to claim 1, wherein the vehicle component comprises an electrical part.

9. The saddle-riding type vehicle of claim 3, wherein the opening has a plurality of louvers formed proximate an inner peripheral edge thereof.

10. A saddle-riding type vehicle comprising:
a vehicle component disposed on a first side of the vehicle in a vehicle width direction, wherein:
the vehicle component is covered by a shroud comprising an inner shroud and an outer shroud,
the inner shroud covering the vehicle component from forward and above, the inner shroud having an opening formed therein at a portion thereof where the vehicle component faces upwardly, and
the outer shroud is provided for covering the vehicle component from outside in the vehicle width direction, and the outer shroud overlaps the opening, and covers the opening from above, and
wherein the outer shroud includes a front shroud portion having an upper end disposed in a side view, above the opening, and a lower end disposed below the opening, the front shroud portion having a sideways chevron shape, and a rear shroud portion formed continuously with, and extending rearward from a rear part of the front shroud portion, and the opening is covered by an upper part of the front shroud portion including the upper end.

11. The saddle-riding type vehicle according to claim 10, wherein the vehicle component comprises a coolant reservoir tank, and where the inner shroud has a slot formed therein to permit viewing of the vehicle component therethrough.

12. The saddle-riding type vehicle according to claim 10, wherein at least part of the opening is covered, in a side view, by the rear shroud portion.

13. The saddle-riding type vehicle according to claim 10, wherein the inner shroud has a hole formed therein separately from the opening, the hole opening forwardly, and wherein a horn faces outwardly through the hole.

14. The saddle-riding type vehicle according to claim 11, wherein the inner shroud has a hole formed therein separately from the opening, the hole opening forwardly, and wherein a horn is disposed so as to face outwardly through the hole.

15. The saddle-riding type vehicle according to claim 10, wherein the opening has a plurality of louvers formed on an inner peripheral edge thereof.

16. The saddle-riding type vehicle according to claim 10, wherein a radiator is disposed substantially opposite to the vehicle component across the vehicle width direction centerline.

17. The saddle-riding type vehicle according to claim 10, wherein the vehicle component comprises an electrical regulator.

18. The saddle-riding type vehicle of claim 10, wherein the opening has a plurality of louvers formed on an inner peripheral edge thereof.

19. A saddle-riding type vehicle comprising:
a vehicle component disposed on a first side of a vehicle width direction across a vehicle width direction centerline at a position at which the vehicle component does not overlap a fuel tank in a top view, wherein:
the vehicle component is covered by a shroud at least from an upward direction, wherein the shroud has an opening formed therein at a portion thereof where part the vehicle component faces upwardly, and another part of the shroud overlaps the opening, and covers the opening from above,
the shroud including an outer shroud for covering the vehicle component from outside in the vehicle width direction, and an inner shroud disposed inside of the outer shroud and provided for covering the vehicle component from forward and above, the inner shroud having the opening formed therein, and wherein part of the outer shroud extends over the opening to cover the opening.

* * * * *